United States Patent [19]

Fry et al.

[11] 4,394,724

[45] Jul. 19, 1983

[54] PROPULSION MOTOR CONTROL APPARATUS AND METHOD

[75] Inventors: Warren C. Fry, West Mifflin; James H. Franz, Murrysville; Paul J. Merlino, West Newton, all of Pa.

[73] Assignee: Westinghouse Electric Corp., Pittsburgh, Pa.

[21] Appl. No.: 316,698

[22] Filed: Oct. 30, 1981

[51] Int. Cl.³ .................. H02M 3/315; H02P 5/16
[52] U.S. Cl. .................... 363/124; 363/57; 323/287; 361/100; 318/345 C; 318/345 G
[58] Field of Search ............. 363/54, 57-58, 363/96, 124, 138; 323/286, 287; 307/252 K, 252 M; 318/341, 345 C, 345 G, 139; 361/93, 98, 100, 101

[56] References Cited

U.S. PATENT DOCUMENTS

| 3,614,594 | 10/1971 | John .................. 363/138 |
| 3,636,422 | 1/1972 | Miller et al. ........... 318/95 |
| 3,657,625 | 4/1972 | Miller et al. .......... 318/370 |
| 3,852,656 | 12/1974 | Bourbeau ............. 363/58 |
| 3,931,567 | 1/1976 | Kostecki ............. 323/287 |
| 4,257,092 | 3/1981 | Prines et al. ......... 363/124 |
| 4,258,309 | 3/1981 | Ohsaka et al. ........ 323/287 |
| 4,339,697 | 7/1982 | Franz ............... 318/345 G |
| 4,358,811 | 11/1982 | Arrzmann ............ 361/100 |

OTHER PUBLICATIONS

B. J. Krings, "Alternative Systems for Rapid-Transit Propulsion and Electrical Braking", Westinghouse Engineer, Mar. 1973, vol. 33, No. 2, pp. 34-41.

Primary Examiner—William M. Shoop
Assistant Examiner—Peter S. Wong
Attorney, Agent, or Firm—R. G. Brodahl

[57] ABSTRACT

A vehicle propulsion motor control apparatus includes a motor current regulating chopper apparatus and a free wheeling diode in the motor circuit. It is desired that the chopper apparatus not be commutated OFF when the free wheeling diode is conducting motor current to prevent damage to the free wheeling diode. A current detector is provided to prevent commutation of the chopper apparatus in response to sensing a current flow through the free wheeling diode.

8 Claims, 2 Drawing Figures

PROPULSION MOTOR CONTROL APPARATUS AND METHOD

CROSS-REFERENCE TO RELATED APPLICATION

The present invention is related to a previously filed patent application Ser. No. 149,358, filed May 13, 1980 by J. W. Franz, Jr. and entitled "Propulsion Motor Control Apparatus and Method", now U.S. Pat. No. 4,339,697, which is assigned to the same assignee and the disclosure of which is incorporated herein by reference.

BACKGROUND OF THE INVENTION

It is known in the prior art to utilize a chopper for regulating the current in the propulsion motor circuit of a transit vehicle moving along a roadway track as described in an article published in the Westinghouse Engineer for March 1973 at pages 34 to 41. A conduction control apparatus responsive to an effort request P signal determines the ON conduction of the main thyristor switch within the chopper. A commutation circuit is provided to turn OFF the main thyristor switch of the chopper, which commutation circuit includes a turn-off thyristor and a charge storage capacitor charged to the same voltage level as the line voltage source. Propulsion motors have been controlled by a software program controlled microprocessor as disclosed in U.S. Pat. Nos. 4,090,115 of J. H. Franz, 4,095,153 of T. C. Matty and J. H. Franz, and 4,123,693 of L. W. Anderson and J. H. Franz.

In an article entitled "Propulsion Control for Passenger Trains Provides High Speed Service" that was published in the Westinghouse Engineer for September 1970 at pages 143 to 149 there is discussed the operation of the P signal to establish the requested tractive effort of the vehicle.

SUMMARY OF THE INVENTION

A chopper circuit for controlling a vehicle propulsion motor includes a free wheeling diode, which conducts the motor current when the main thyristor is not conducting. The flow of current through that free wheeling diode is sensed to prevent the commutation of the main thyristor by an OFF pulse when there is current flow sensed through the free wheeling diode.

DESCRIPTION OF THE PREFERRED EMBODIMENT

Figure 1:
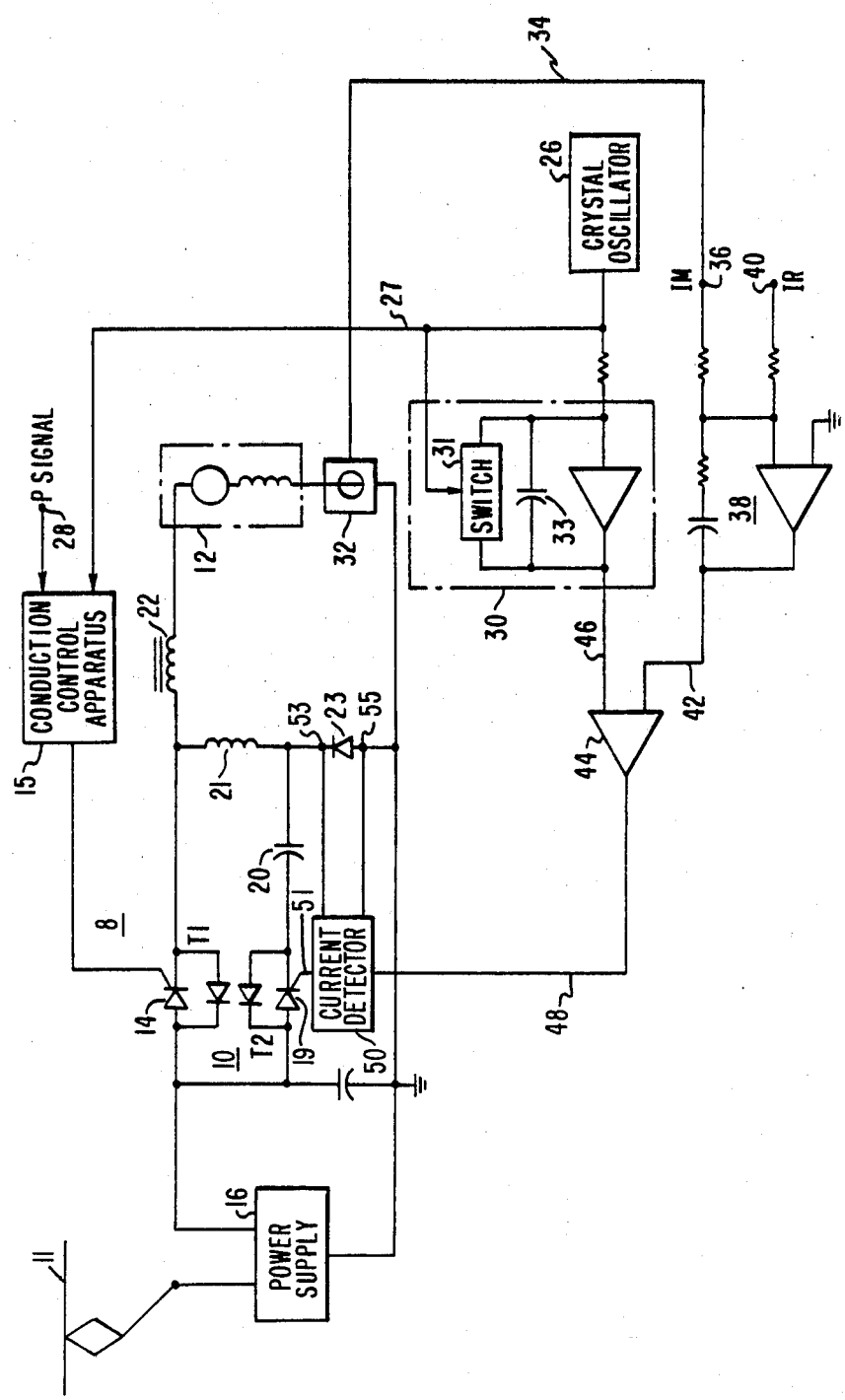
FIG. 1 schematically shows the propulsion motor control apparatus of an embodiment of the present invention.

In FIG. 1 there is shown an operation control load circuit 8 for a transit vehicle propulsion motor control chopper apparatus. In the motoring mode the load circuit 8 includes a chopper 10 regulating the current in the motor circuit 12. When the main thyristor 14 of the chopper 10 is turned on, by the conduction control apparatus 15 in response to an effort request P signal, this builds up current in the motor circuit 12 by completing the circuit from the positive side of the D.C. power supply 16 through the motor circuit 12 to ground return 18 and then to the negative side of the power supply 16. When the main thyristor 14 of the chopper is turned off by the commutating thyristor 19 operative with the commutating capacitor 20 and the inductor 21, the energy stored in the motor reactor 22 and the inductance of the motor circuit 12 maintains the current flow in the motor circuit 12 through the free wheeling diode 23. The average voltage applied to the motor circuit 12 is controlled by adjusting the ratio of the chopper OFF time to the chopper ON time. This adjustment is made by the conduction control apparatus 15 to maintain the desired average motor current and hence the desired motor torque as described in the above referenced article published in the Westinghouse Engineer for March 1973 at pages 34 to 41.

The crystal oscillator 26 provides a control signal at a predetermined rate, such as 218 hertz, to the conduction apparatus 15 to fire ON the main thyristor 14 as required in accordance with the effort request P signal supplied on input 28. The crystal oscillator 26 also provides a control signal at the same predetermined rate to the sawtooth generator 30. The actual current IM in the motor circuit 12 is sensed by a current transducer 32, such as a Hall effect device, and a current signal 34 is supplied to a first input 36 of the phase control error circuit 38. A second input 40 of the error circuit 38 receives a well known current request signal IR in accordance with the P signal, the sensed vehicle speed and the sensed vehicle weight. There is a proportional plus integral operation by the error circuit 38 to establish the difference error 42 between the actual motor current IM at input 36 and the requested motor current IR at input 40. The comparator 44 operates to compare the error signal 42 with the sawtooth ramp signal 46, and where the error signal 42 intersects, the ramp signal 46 as described in the above referenced patent application establishes when the OFF pulse 48 is provided to fire ON the commutator thyristor 19 and to turn OFF the main thyristor 14. The crystal oscillator 26 determines the turn ON time of the main thyristor 14 in response to the effort request P signal 28 operative with the conduction apparatus 15 at the crystal time base such as 218 hertz. The turn OFF time of the main thyristor 14 is determined by the error signal 42 in conjunction with the ramp signal 46.

A current detector 50 is provided to sense any current flow through the free wheeling diode 23 for preventing the OFF pulse 48 from firing ON the commutator thyristor 19 when there is detected such a current flow. If current is detected to be flowing through the free wheeling diode 23, it is desired that the main thyristor 14 not be commutated OFF in that it has been established that there is a high probability of destroying the free wheeling diode 23 when current is flowing through that diode 23 when the main thyristor 14 is commutated OFF. In normal chopper operation, the free wheeling diode 23 is not conducting current at the same time that the main thyristor is commutated OFF, but it has been determined empirically that the diode 23 can be conducting abnormally due to large line voltage changes which affect this current path in the chopper after the main thyristor 14 has been turned ON. For example, when the main thyristor 14 is conducting and subsequently a gap occurs in the well known power line 11 supplying current to the power supply, the resulting sudden drop in the line voltage can cause the free wheeling diode 23 to being conducting current.

Figure 2:
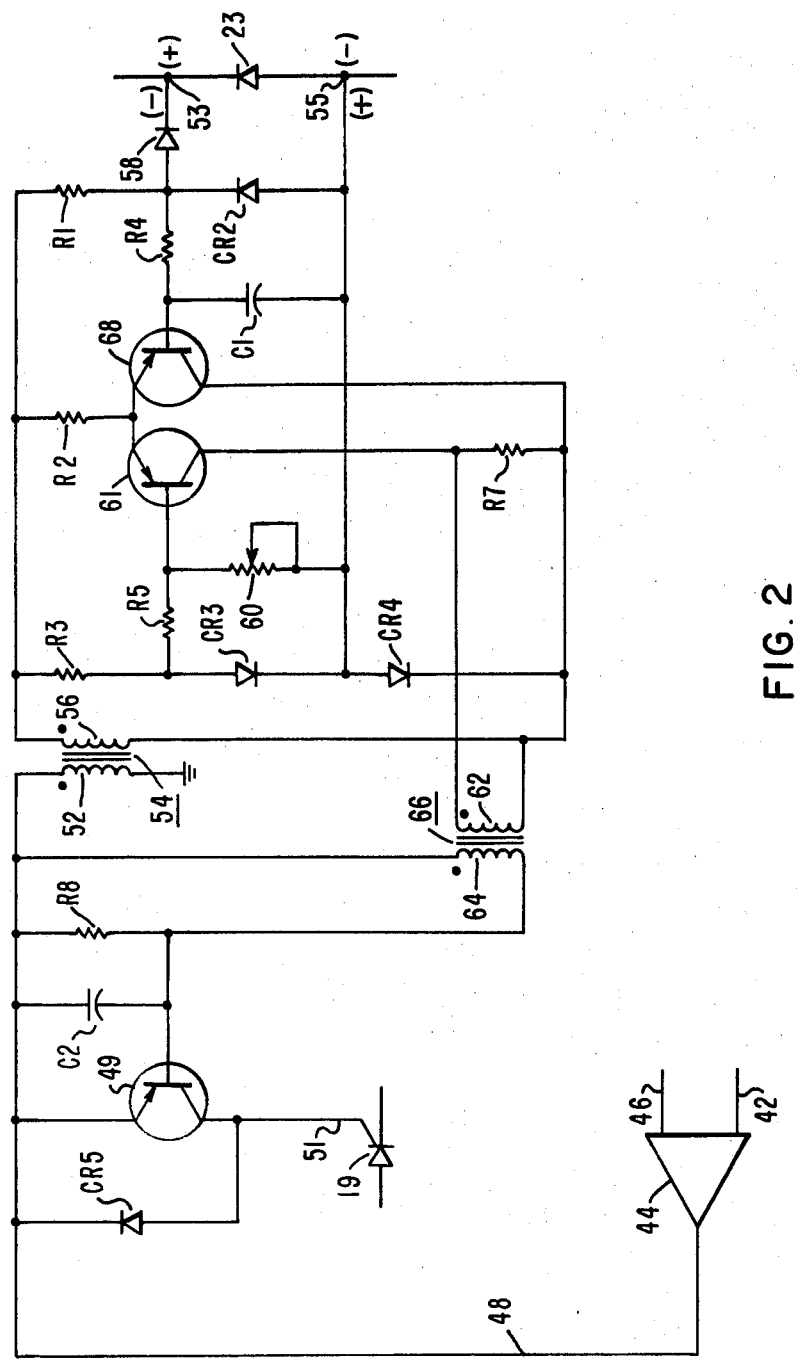
FIG. 2 shows the current detector used in the present invention.

In FIG. 2 there is shown the current detector 50, responsive to the OFF pulse on the conductor 48 coming from the comparator 44. This OFF pulse passes through the conducting transistor 49, after the current detector 50 determines the free wheeling diode 23 is not conducting current, and passes the OFF pulse to turn ON the commutating thyristor 19 to turn OFF the main thyristor 14. When the free wheeling diode 23 is so determined to be conducting current, the transistor 49 is not made conducting so the OFF pulse on conductor 48 does not pass through the transistor 49 to the conductor 51 connected to control the firing of the commutator thyristor 19.

When an OFF pulse is applied to conductor 48, this pulse is first applied to the primary winding 52 of a transformer 54 including a secondary winding 56. As long as the voltage polarity across the free wheeling diode 23 is such that the anode is minus and the cathode is plus as marked to the right of diode 23, and the anode of diode 58 will be at about plus 0.5 volts. The potentiometer 60 is adjusted initially, and then can be soldered in place if desired, to provide a voltage bias on the base of transistor 61 of about plus 0.4 volts, and thus biases the transistor 61 to be conducting. The OFF pulse applied to conductor 48 energizes the primary winding 52 and then the secondary winding 56 of transformer 54 to pass a pulse of energy through the conducting transistor 61 which energy pulse then passes through the primary winding 62 coupled with the secondary winding 64 of transformer 66. This pulse energy then provides a negative drive for the base of transistor 49 to make the transistor 49 conducting and to pass the OFF pulse from conductor 48 to the conductor 51 leading to control the thyristor 19.

The typical OFF pulse applied to conductor 48 for firing the commutation thyristor 19 lasts about 50 microseconds. The time delay required for the current detector 50 to sense if the free wheeling diode is conducting current is about 1 microsecond. Thusly, the remaining about 49 microseconds of the OFF pulse on conductor 48 will be passed through after the transistor 49 becomes conducting and is then applied to the conductor 51 if the free wheeling diode 23 is not conducting current.

When the free wheeling diode 23 is conducting current, assume the same OFF pulse is applied to the conductor 48. With the diode 23 conducting current, the voltage across the diode 23 changes to the cathode being minus and the anode plus as shown to the left of the diode 23 in FIG. 2. Because of the voltage drop across the diode 58, the anode of the diode 58 is pulled down to about plus 0.3 volt and lower than the provided plus 0.4 volt bias on the base of transistor 61. The transistors 61 and 68 comprise a well known differential amplifier, and the lower base drive for the transistor 68 now operates to turn ON the transistor 68 and bypass the pulse energy from the secondary winding 56 due to the OFF pulse being applied to the primary winding 52. Thusly, the primary winding 62 does not now receive any of this pulse energy, so the negative drive for the base of transistor 49 is not provided and the transistor 49 does not become conductive in relation to passing the rest of the OFF pulse on conductor 48 to the conductor 51. Therefore, with the free wheeling diode 23 conducting motor current, the transistor 68 turns ON and the OFF pulse current from the secondary winding 56 does not flow through the primary winding 62.

The OFF pulse applied to conductor 48 provides current pulse energy to determine if the free wheeling diode 23 is conducting motor current, and if the transistor 61 is conducting this indicates that the diode 23 is not conducting motor current, so that pulse current comes back through the transformer windings 62 and 64 to fire the transistor 49 in time for the rest of the OFF pulse to fire the commutation thyristor 19 and turn OFF the main thyristor 14.

The following components were utilized to make an actual working embodiment of the current detector 50 that was suitable for one practical application of the present invention.

Capacitors C1 and C2–1000 picofarads
Diodes 58, CR2 and CR3–MR250-5
Diodes CR4 and CR5–1N4936
Transistors 41, 61 and 68–2N2907A
Resistors R1, R2 and R3–1.47K
Resistor R4–511
Resistor R5–1K
Resistor 60–1K to 2K
Resistors R7 and R8–10K
Transformers 54 and 66–ferrite core, 200/200 turns ratio, 5000 peak volts DC primary to secondary.

What I claim is:

1. In control apparatus for a load circuit operative with a power supply and including a member through which current passes, with said load circuit being responsive to a control pulse to determine the operation of said load circuit, the combination of
    first switch means for coupling the control pulse to said load circuit when the first switch means is conductive,
    second switch means responsive to current passing through said member and being made conductive in accordance with the passage of current through said member,
    first signal means for applying said control pulse through the second switch means when the second switch means is conductive, and
    second signal means coupled with the second switch means and controlling the conductivity of the first switch means when the second switch means is conductive.

2. The control apparatus of claim 1, with the second switch means being made conductive when there is no current passing through said member.

3. The control apparatus of claim 1, with the second switch means being responsive to the polarity of the voltage across said member caused by the current passing through said member and being made conductive in accordance with a predetermined voltage polarity across said member in accordance with that current passage.

4. The control apparatus of claim 1,
    with the second switch means being made conductive in accordance with the polarity of the voltage across said member as determined by the current passing through said member, and
    with the second signal means providing a bias voltage to control the conductivity of the first switch means when the second switch means is conductive.

5. In current detector apparatus operative with a load circuit including a load current controlling device and a member through which load current flows and responsive to a control signal to determing the operation of the load current controlling device, the combination of switch means connected to apply said control signal to said load current controlling device when said switch means is conductive, means providing an energy pulse in response to said control signal for biasing the switch means to be conductive, and means coupled with said energy pulse providing means and responsive to current flow through said member and responsive to said control signal for determining the provision of said energy pulse.

6. The current detector apparatus of claim 5, with said switch means being responsive to a bias voltage to become conductive, and with said energy pulse providing a bias voltage to said switch means through the energy pulse provision determining means to result in said switch means becoming conductive.

7. The current detector apparatus of claim 5, with said control signal having a known time duration, and with said energy pulse provision determining means being responsive to the control signal for a portion of said time duration for determining the provision of said energy pulse for the remainder of said time duration.

8. The current detector apparatus of claim 5, with said energy pulse providing means including a first switch device coupling the energy pulse with said switch means and a second switch device not coupling said energy pulse with said switch means, and with said energy pulse providing means being responsive to the load current flow through said member for causing the first switch means to become conductive when load current is not flowing through said member and for causing the second switch means to become conductive when load current is flowing through said member.

* * * * *